No. 805,200. PATENTED NOV. 21, 1905.
G. HALLER.
FRONT GEAR FOR VEHICLES.
APPLICATION FILED FEB. 4, 1905.
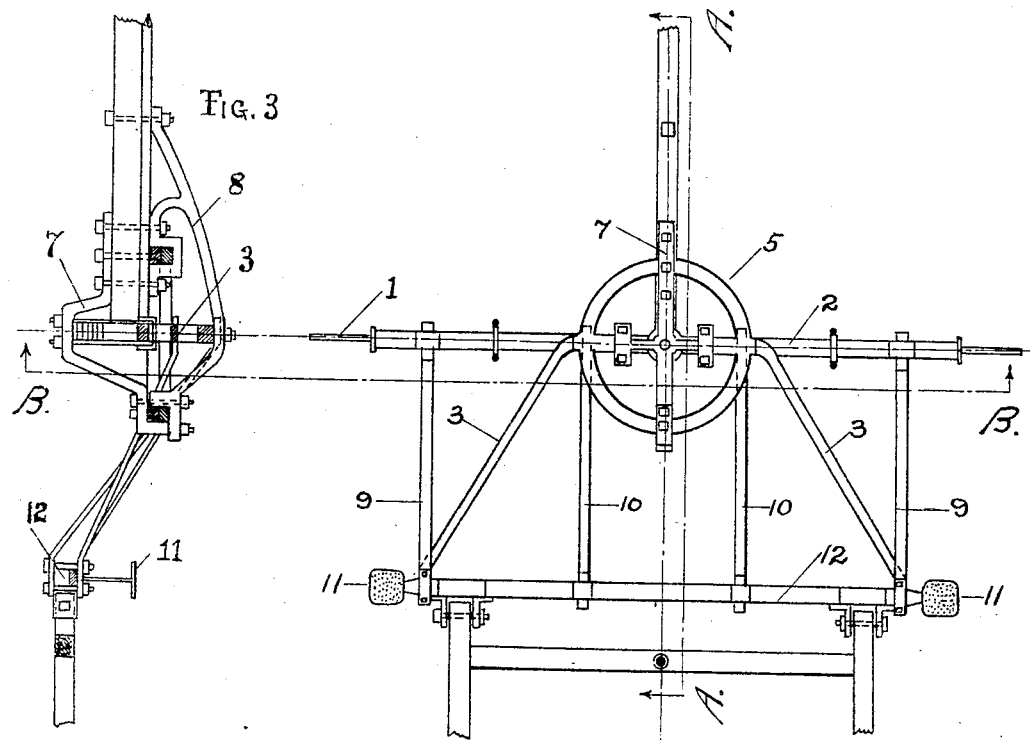
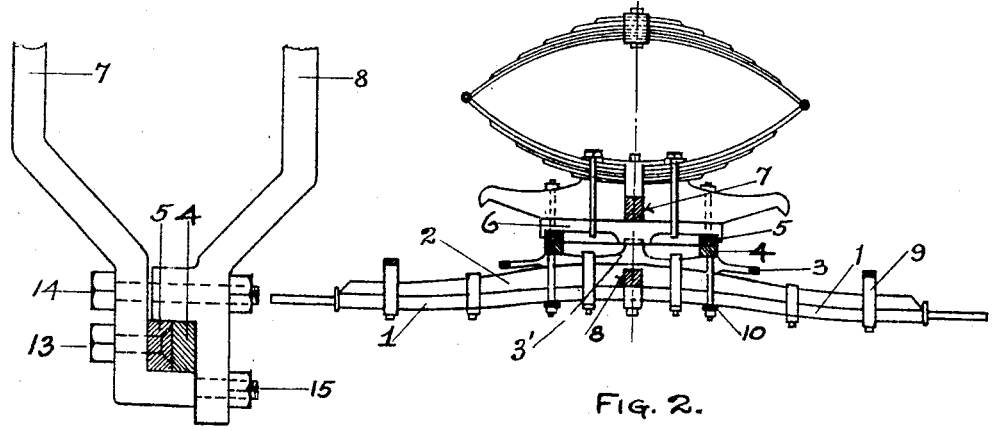
Witnesses.
Roscoe S. Conkling
William Finnie
George Haller Inventor.
By Pierce Butler
Attorney.

UNITED STATES PATENT OFFICE.

GEORGE HALLER, OF LOUISVILLE, KENTUCKY.

FRONT GEAR FOR VEHICLES.

No. 805,200.  Specification of Letters Patent.  Patented Nov. 21, 1905.

Application filed February 4, 1905. Serial No. 244,134.

*To all whom it may concern:*

Be it known that I, GEORGE HALLER, a citizen of the United States, residing at Louisville, in the county of Jefferson and State of Kentucky, have invented certain new and useful Improvements in Front Gears for Vehicles, of which the following is a specification, reference being had therein to the accompanying drawings.

My invention relates to improvements in the front gear of vehicles commonly known as "three-spring" vehicles, in which the front of the body is supported upon a spring placed transversely to the length of the vehicle or parallel to the direction of the axles. In this class of vehicles the shafts or tongues attach directly to the forward axle by means of shaft-couplings and have a pivotal motion about a pin through said coupling. In this form the back end of shafts must be made heavy to resist the lateral strains caused by turning and for this reason throws an unnecessary amount of weight upon the horse, and in some forms of such wagons, as delivery-wagons, where a step is placed upon the shaft, the weight of the driver and the shock occasioned by the use of the step are transmitted directly to the horse. In vehicles with this form of shafts it is impossible to elevate the shafts into a perpendicular position, owing to the downward bend of the back end of the shafts and to the position of the pin about which they revolve. This is an undesirable feature, for several reasons.

My invention relates to that form of front gear for three-spring wagons in which the shafts and tongues are pivotally attached to a front bar rigidly attached to the front axle by means of bars and braces at a desired distance above and forward of said axle.

My invention relates not to this general form of construction, but to the special features described, and shown in the accompanying drawings, in which—

Figure 1 is a plan of the front gear of a three-spring wagon. Fig. 2 is a front view showing a section on the line B B. Fig. 3 is a sectional view on the line A A of Fig. 1. Fig. 4 is a detail view showing the method of confining the two halves of the fifth-wheel forward of the front axle.

Similar figures refer to similar parts in all views.

1 is the metal axle.

2 is the wooden cap.

3' is the lower metal post-plate resting upon the axle-cap 2, which in my invention is continued by having extensions 3 to the outer end of the front bar 12 of the gear.

4 is the lower or movable fifth-wheel, made in a complete circle.

5 is the upper or stationary fifth-wheel, also made in a complete circle.

6 is the upper post-plate, to which the upper fifth-wheel 5 is attached and to which are also attached the head-block and spring.

7 and 8 are respectively the upper spring-brace and lower king-bolt brace, which in my invention are extended forward of the axle and their ends formed to surround the fifth-wheels 4 and 5, as shown in Fig. 4.

9 and 10 are metal rods or bars one end of which is rigidly attached to the axle and the other end rigidly attached to the front bar 12 of the gear. They are bent in such shape as to firmly hold the bar 12 in the desired position relative to the axle.

11 represents steps attached to the outer ends of the front bar 12 for convenience in entering or leaving the vehicle.

12 is the front bar of the gear, to which is attached the shafts or, if desired, a tongue.

With this construction the shafts may be made lighter and may be raised into a vertical position, thus diminishing the floor-space occupied by the vehicle and reducing the chances of damage to the shafts. The features of this form of front gear which I claim as my invention are the following:

First, the extensions 3 of the outer ends of post-plate 3' to form braces for the outer ends of the front bar 12. These braces 3, extending from the outer end of front bar 12 angularly to the supporting-bars 9 and 10, form true braces and prevent any lateral motion of the supported parts. The lateral extensions 3 of the post-plate 3' to form braces for the outward ends of the front bar 12 are considered by me to be the best means for accomplishing this bracing and is what I have selected to show in the drawings; but my invention also contemplates making the lower fifth-wheel 4 somewhat more than a semicircle and extending the portions forward of the axle to the outer ends of the front bar 12 to form braces. Again, the extensions 3, forming braces, may extend from the outer end of the front bar 12 and be welded or otherwise rigidly attached to either the post-plates, the lower fifth-wheel 4, or the axle 1.

Second, the extension of the braces 7 and 8 beyond the axle 1 to the front side of the upper and lower fifth-wheels 4 and 5, the upper brace 7, being rigidly attached to the upper fifth-wheel 5 by a bolt 13 and to the end of the lower brace 8 by bolts 14 and 15, forming a guide through which the lower fifth-wheel may be moved in the plane of the wheel and at the same time preventing any movement tending to separate the two fifth-wheels.

It is evident that a weight coming upon the step 11 would tend to cause a revolution of the axle 1, the rods 9 and 10, and the front bar 12 about the center of the journal of the axle, which motion would tend to spread apart the front portion of the fifth-wheels 4 and 5. To avoid this tendency is the object of bringing the braces 7 and 8 together to form the guide, as described, thus giving extra rigidity to the gear.

Having described my invention, what I claim as new, and desire to secure by Letters Patent, is—

A front gear for vehicles comprising an axle, a front bar, a cap supported on the axle, a post-plate secured to said cap, braces integral with and extending from the post-plate and connected with the ends of the front bar, a lower fifth-wheel supported on the post-plate, an upper fifth-wheel, an upper spring-brace and a lower king-pin brace extending to the forward side of the fifth-wheel circle and fastened together to form a guide to prevent the separation of the upper and lower fifth-wheels and means for securing the upper fifth-wheel to the vehicle-body.

In testimony whereof I have affixed my signature in presence of two witnesses.

GEORGE HALLER.

Witnesses:
  Wm. G. Wettover,
  B. S. Thomas.